United States Patent [19]

Nakamura et al.

[11] Patent Number: 5,197,915

[45] Date of Patent: Mar. 30, 1993

[54] METHOD AND APPARATUS FOR SUSPENDING A CHAIN OF LINKED

[75] Inventors: Minoru Nakamura, Tokyo; Nobuo Kimura, Sagamihara; Minoru Kasai, Ebina, all of Japan

[73] Assignee: Hitec Co., Ltd., Japan

[21] Appl. No.: 824,286

[22] Filed: Jan. 23, 1992

[30] Foreign Application Priority Data

Jan. 25, 1991 [JP] Japan .................................. 3-023892

[51] Int. Cl.$^5$ ...................... B65G 37/00; A22C 11/00
[52] U.S. Cl. ..................................... 452/51; 452/186; 226/104
[58] Field of Search ...................... 452/51, 46, 49, 186; 226/104, 105

[56] References Cited

U.S. PATENT DOCUMENTS

| | | | |
|---|---|---|---|
| 3,680,757 | 8/1972 | Wallace | 226/105 |
| 4,218,003 | 8/1980 | Plewa et al. | 452/51 |
| 4,233,709 | 11/1980 | Smith et al. | 452/51 |
| 4,494,276 | 1/1985 | Trottmann | 452/51 |
| 4,880,105 | 11/1989 | Kasai et al. | 452/51 |
| 5,073,142 | 12/1991 | Kasai et al. | 452/51 |

Primary Examiner—Willis Little
Attorney, Agent, or Firm—Wegner, Cantor Mueller & Player

[57] ABSTRACT

In the suspending method, a signal of a value proportional to the amount of movement of the conveying device for conveying a chain of products is generated, and suspending members are controlled on the basis of that signal in such a manner as to suspend the chain of products for each desired number of links to be suspended. Meanwhile, the suspending apparatus has a signal generating device for generating a signal of a value proportional to the amount of movement of the conveying device for conveying the chain of products. A suspending device is connected to a controlling device for controlling the movement of the suspending members, and on the basis of that signal the controlling device causes the suspending members to move in such a manner as to suspend the chain of products for each desired number of links.

8 Claims, 12 Drawing Sheets

METHOD AND APPARATUS FOR SUSPENDING A CHAIN OF LINKED

BACKGROUND OF THE INVENTION

1. Field of the Invention

The present invention relates to a method and an apparatus for suspending a chain of linked products such as sausages in which a material such as meat is stuffed in a casing.

2. Description of the Related Art

A chain of linked products stuffed with a material is subjected to heat processing or other similar processing in an ensuing process, depending on the material. For this reason, the chain of product is suspended from a bar-like member commonly called a smoking stick in a series of loops and are brought into a heat treatment chamber. In order to allow the series of loops to be suspended from the smoking stick, the chain of linked products is conventionally suspended consecutively in the form of loops from a plurality of suspending members that are moving. After the smoking stick is inserted through the loops, the smoking stick is lifted up so as to transfer the series of loops onto the smoking stick.

Two types of apparatus are conventionally known as the apparatus for suspending loops.

First, the following apparatus is known as the first type. A mainly tubular guide member for guiding the chain of linked products is connected to a downstream end of a conveying device for conveying the chain of linked products. The chain of linked products is released into an open space while a release outlet of the guide member is being eccentrically rotated or being swung. Hook-like suspending members disposed at predetermined intervals on an endlessly traveling member are made to travel along a path intersecting to the movement of the released chain of linked products so as to consecutively retain the chain of linked products by the suspending members, thereby forming loops. With an apparatus of the above-described type, the conveying device and a suspending device are interlocked by means of chain transmission in such a manner that the operation of the guide member and the movement of the suspending members are synchronized at a retaining position. Then, each length of the chain of linked products to be suspended can be selected by changing the ratio of the number of teeth of respective sprockets of the conveying device and the suspending device in the chain transmission. Apparatuses of the above-described type are disclosed in Japanese Patent Publication No. 5899/1966 (U.S. Pat. No. 3,191,222), Japanese Utility Model Laid-Open No. 1594/1975, Japanese Patent Publication No. 26084/1980 (U.S. Pat. No. 3,964,129), and Japanese Patent Publication No. 13329/1989 (U.S. Pat. No. 4,539,796), and the like.

Next, as the second type, an apparatus is known in which the number of links of the chain of linked products passing through a fixed point in the conveying device is detected, whereby the movement of the endlessly traveling member of the suspending device is controlled. Apparatuses of this type are disclosed in Japanese Patent Publication Nos. 43210/1982 and 27023/1986 (U.S. Pat. No. 4,218,003). With these apparatuses, a contact finger is brought into direct contact with the chain of linked products being conveyed, so as to detect the links.

With the above-described conventional apparatuses, the following drawbacks have been encountered.

First, with the apparatus of the first type, when it is desirous to change the length of the link of the chain of linked products or the suspension length (the size of the loop), it is necessary to change the ratio of the number of teeth of the sprockets because of chain transmission. For that reason, it is necessary to replace the sprockets to those having different numbers of teeth and the chain to one having a length corresponding to the same. Hence, replacement requires time and trouble, and the apparatus is shut down during that time, causing a decline in the operating ratio. In addition, different sprockets and chains must be stocked, which increases the cost.

Meanwhile, with the apparatus of the second type, since there are no component parts which require replacement, such as sprockets, the change of the link length and the size of the loop is conducted simply.

With the apparatus of this type, however, since the contact finger is brought into direct contact with the links of the chain of linked products in the conveying device, detection errors are apt to occur owing to the non-uniformity of the shape and hardness of the product, stains attached to the surface, and water used in the apparatus, and the like. In addition, even if the detection is carried out on a non-contact basis, these detection errors cannot be avoided insofar as the links are detected. If such detection errors occur, it becomes impossible to form desired loops. Furthermore, since detection errors are apt to occur, this arrangement is unsuitable for high-speed operations with increased conveying speed.

SUMMARY OF THE INVENTION

Accordingly, an object of the present invention is to provide a method and an apparatus for suspending a chain of linked products capable of facilitating a change in the form of suspension and of reliably forming predetermined loops by eliminating malfunctionings, thereby overcoming the above-described drawbacks of the conventional art.

In accordance with one aspect of the invention, the above object with respect to the method is accomplished by providing a method of suspending a chain of products wherein the chain of products in which a material is stuffed in a casing is conveyed by a conveying device, and the movement of an endlessly traveling member with a plurality of suspending members disposed thereon is controlled such that the chain of products sent from the conveying device is consecutively retained by each of the suspending members for each predetermined number of links, comprising the steps of: generating a signal of a value proportional to an amount of movement of the conveying device; and controlling the suspending members on the basis of the signal in such a manner that the chain of products is suspended from the each of the suspending members for each predetermined number of links.

In accordance with another aspect of the invention, the above object with respect to the apparatus is accomplished by providing an apparatus for suspending a chain of products including a conveying device for conveying the chain of products in which a material is stuffed in a casing; a suspending device having a plurality of suspending members disposed on an endlessly traveling member, the suspending device being arranged such that an intersection between a traveling path of the suspending members and a path of the chain of products defines a retaining position; and a controlling device for effecting control such that each of the suspending members is sequentially brought to the retaining position at each timing when the number of links of the chain of products reaches a predetermined number, the apparatus comprising: a signal generating device for generating a signal of a value proportional to an amount of movement of the conveying device, wherein the controlling device controls the movement of the endlessly traveling member on the basis of the signal from the signal generating device in such a manner that the chain of products is suspended from the each of the suspending members each time the predetermined number of links is reached.

In accordance with the present invention having an arrangement described above, the signal generating device generated a signal proportional to the amount of movement of the conveying device. The controlling device causes a relevant one of the suspending members to move to the retaining position on the basis of the aforementioned signal. The signal generated by the signal generating device is transmitted to the controlling device electrically or under fluid pressure.

The above and other objects, features and advantages of the invention will become more apparent from the following detailed description of the invention when read in conjunction with the accompanying drawings.

DESCRIPTION OF THE PREFERRED EMBODIMENTS

Referring now to the accompanying drawings, a description will be given of the preferred embodiments of the present invention.

Figure 1:
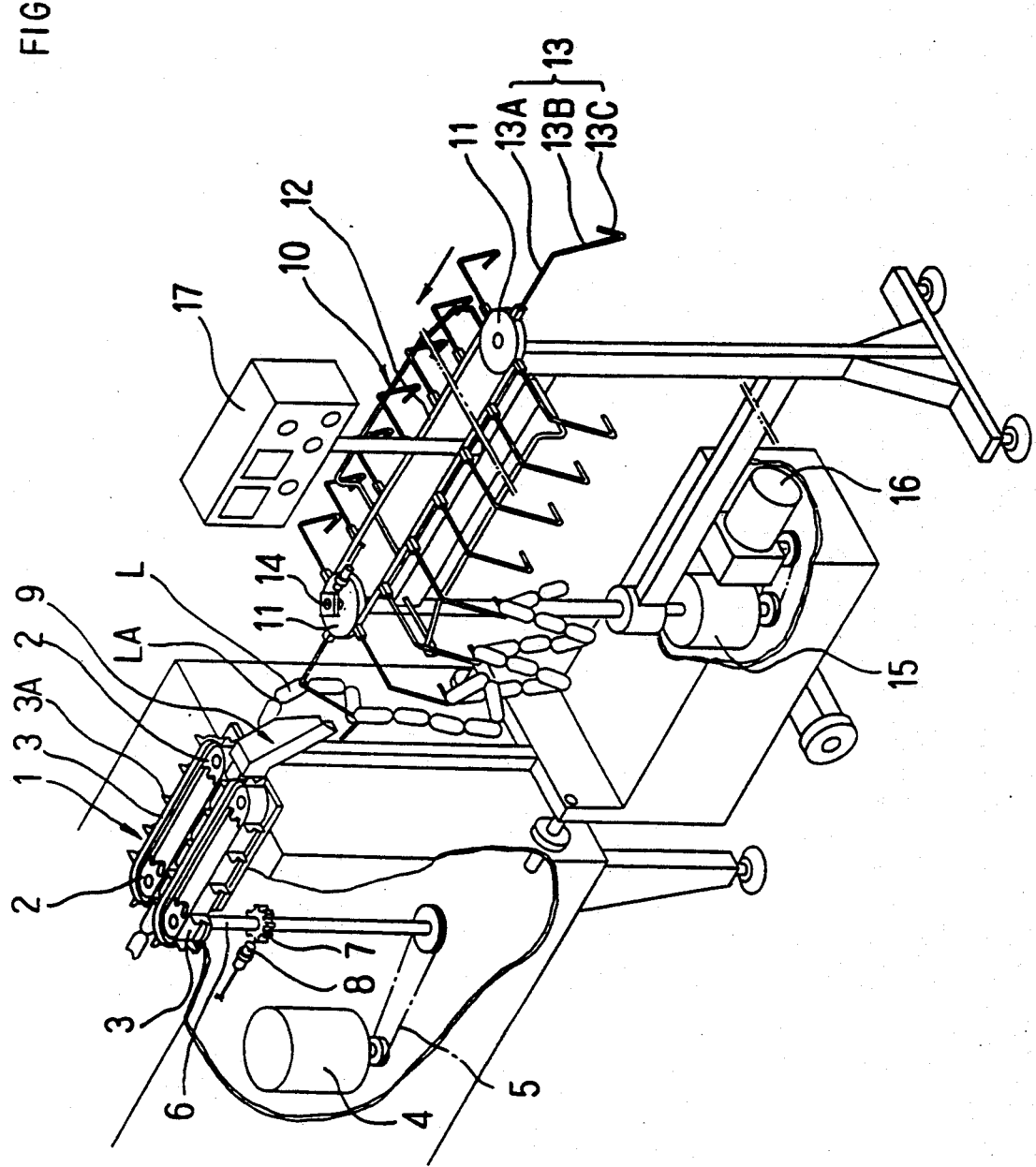
FIG. 1 is a perspective view illustrating an overall schematic arrangement of an apparatus in accordance with an embodiment of the present invention.

In FIG. 1, a conveying device 1 is adapted to convey a chain of linked products in which a material for sausages or other foodstuffs is stuffed in a casing, the chain of linked products being conveyed in the longitudinal direction thereof. As shown in detail in FIGS. 2 and 3, the conveying device 1 comprises a pair of linking chains 3 provided with pinchers 3A and serving as endlessly traveling members for linking. The pair of linking chains 3 are disposed in opposed and parallel relation with each other, and are each trained between sprockets 2 which are rotatively driving members with teeth. The conveying device 1 is adapted to continuously convey the chain of linked products in the longitudinal direction (rightward in the illustrated case) while squeezing and drawing the chain of linked products with the pinchers. The sprockets 2 are rotatively driven by a shaft 6 which is driven by a motor 4 via a belt 5. This conveying device 1 may be substituted by a known linking device disclosed in Japanese Patent Publication No. 27509/1965 (U.S. Pat. No. 3,115,668).

The shaft 6 is provided with a toothed member 7 having teeth 7A, and a proximity switch 8 is provided in proximity to the toothed member 7. The toothed member 7 and the proximity switch 8 constitute a signal generating device for generating a pulse signal which is turned on when each tooth 7A has approached the proximity switch 8 and is turned off between two adjacent ones of the teeth 7A as the shaft 6 rotates.

Figure 2:
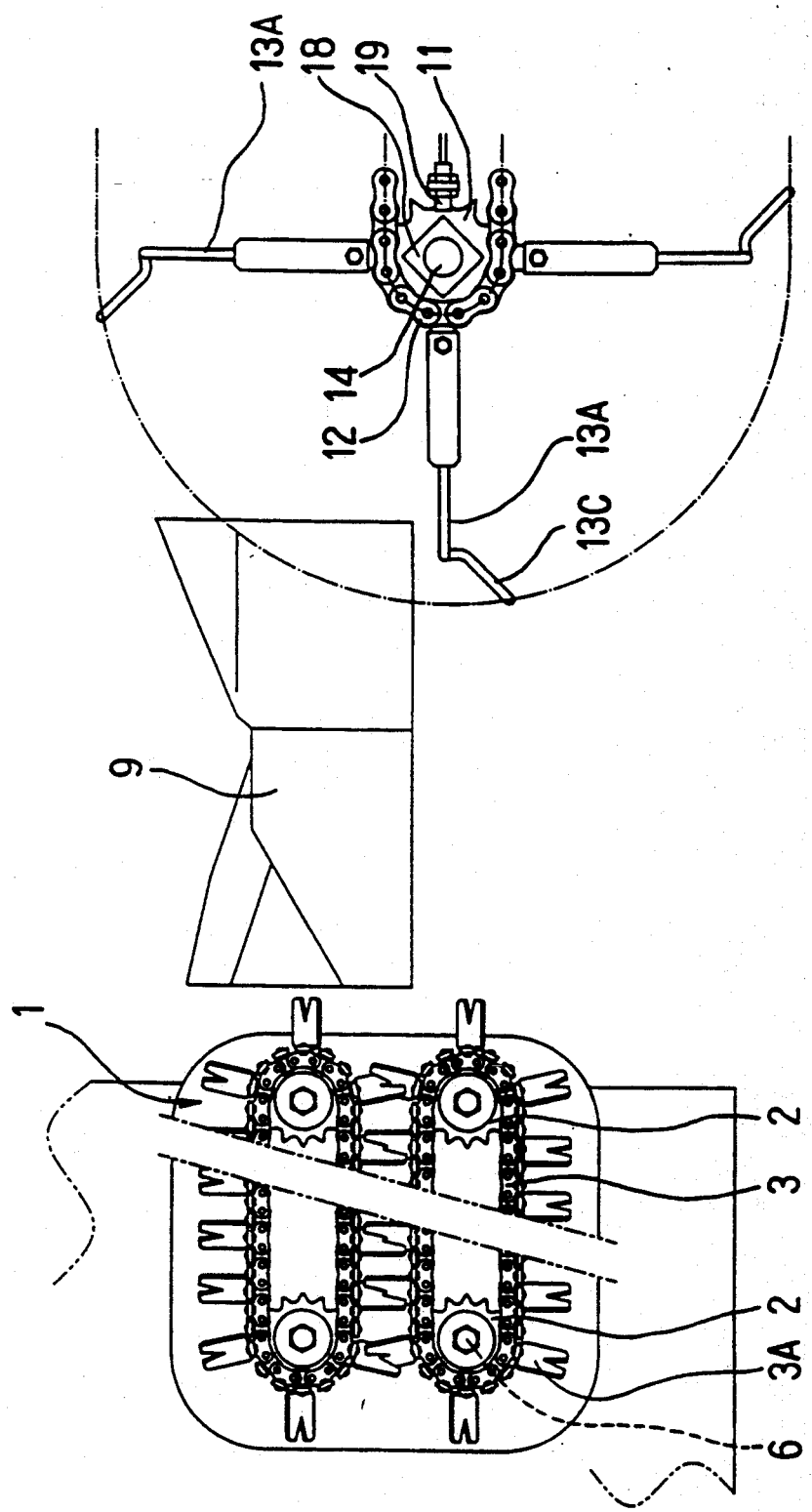
FIG. 2 is a plan view illustrating the positional relationship among a conveying device, a guide member of a suspending device and an endlessly traveling member of the suspending device in the apparatus shown in FIG. 1.
Figure 3:
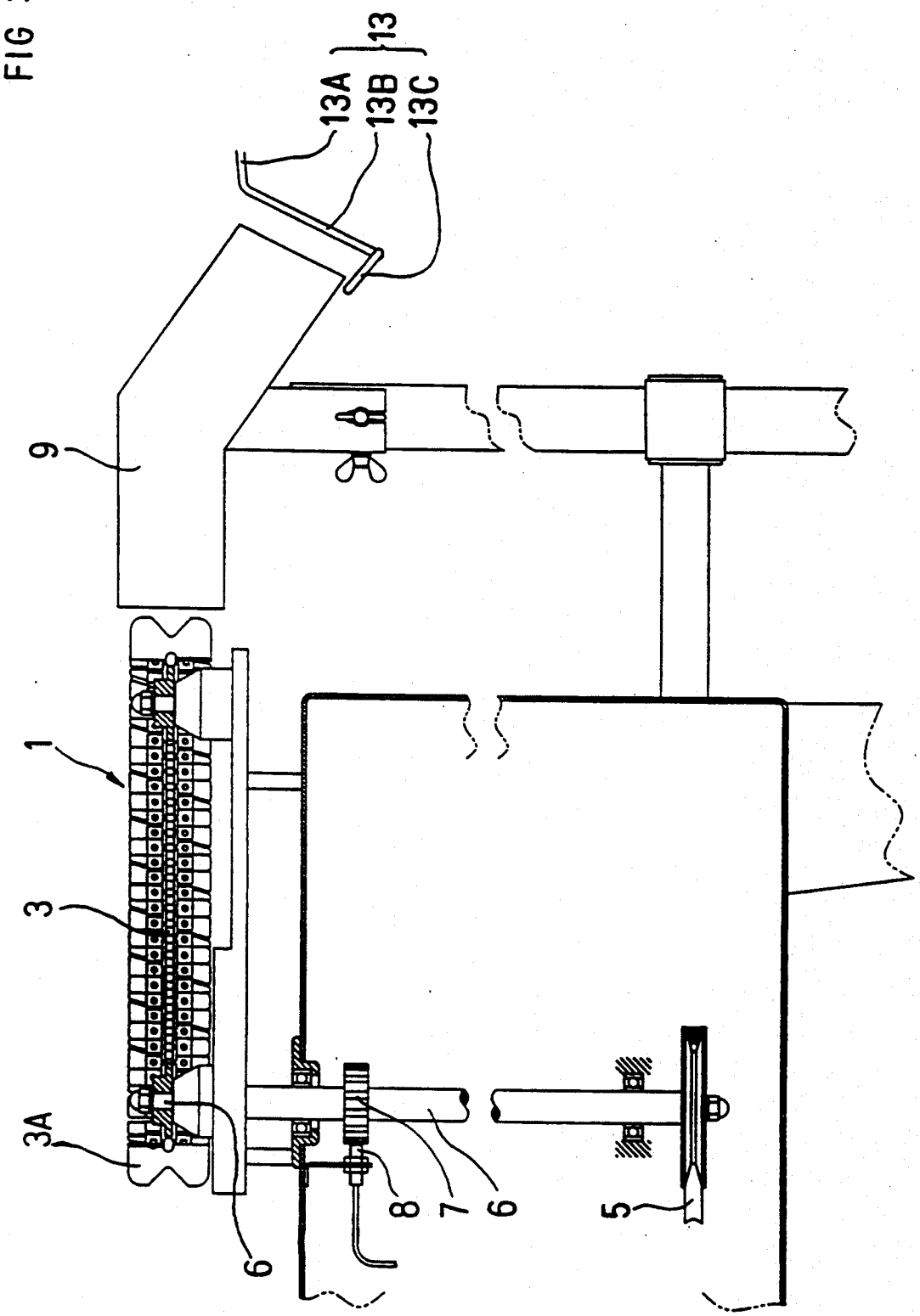
FIG. 3 is a fragmentary front elevational view illustrating the positional relationship among the conveying device, the guide member of the suspending device, and the endlessly traveling member of the suspending device in the apparatus shown FIG. 1.

A guide member 9 is disposed in such a manner as to face an outlet portion (right-hand portion in the drawings) of the conveying device 1 (see FIGS. 2 and 3 as well). The guide member 9 is used to receive the chain of products sent from the conveying device 1 and to guide the same to a position of retention by a suspending member which will be described later. The guide member 9 is configured such that it is inclined diagonally downward in the direction of flow of the chain of products, and one side thereof (right-hand side in FIG. 1) is open. Thus, the guide member 9 is configured such that its longitudinal ends are open in the direction of the path of the chain of products and one side thereof is open in such a manner as to cover the path from three directions.

As shown in FIG. 1, an endlessly traveling member 10 is disposed downstream of the guide member 9, and this endlessly traveling member 10 together with the guide member 9 constitutes a suspending device (see FIGS. 2 and 3 as well). The endlessly traveling member 10 has a chain 12 trained between sprockets 11 at two spaced-apart positions and adapted to travel in a substantially horizontal plane, as indicated by the arrow. A plurality of outwardly projecting hooks 13 which serve as suspending members are provided on the chain 12 at predetermined intervals. Each of the hooks 13 comprises a horizontal proximal fixing portion 13A, an intermediate portion 13B inclined downward therefrom, and a distal end portion 13C extending upward from the intermediate portion 13B and oriented forwardly in the direction of its travel Thus the intermediate portion 13B and the distal end portion 13C form a V-shaped configuration. The positional relationship of each of the hooks 13 relative to the guide member 9 is determined such that the intermediate portion 13B of the hook 13 intersects the path of flow of the chain of products downstream of the guide member 9.

The chain 12 of the endlessly traveling member 10 is rotatively driven by a shaft 14 which is driven at a lower end thereof by a geared motor 16 with a speed reducer via a coupling portion 15 incorporating a clutch and a brake.

This suspending device has a controlling device 17 connected to the coupling portion 15. Upon receiving a signal from the proximity switch 8 in the signal generating device provided in the conveying device 1, the controlling device 17 processes the signal to generate a signal for actuating the clutch so as to bring relevant ones of the hooks 13 to the retaining position intermittently at predetermined timings, as will be described later.

Figure 4:
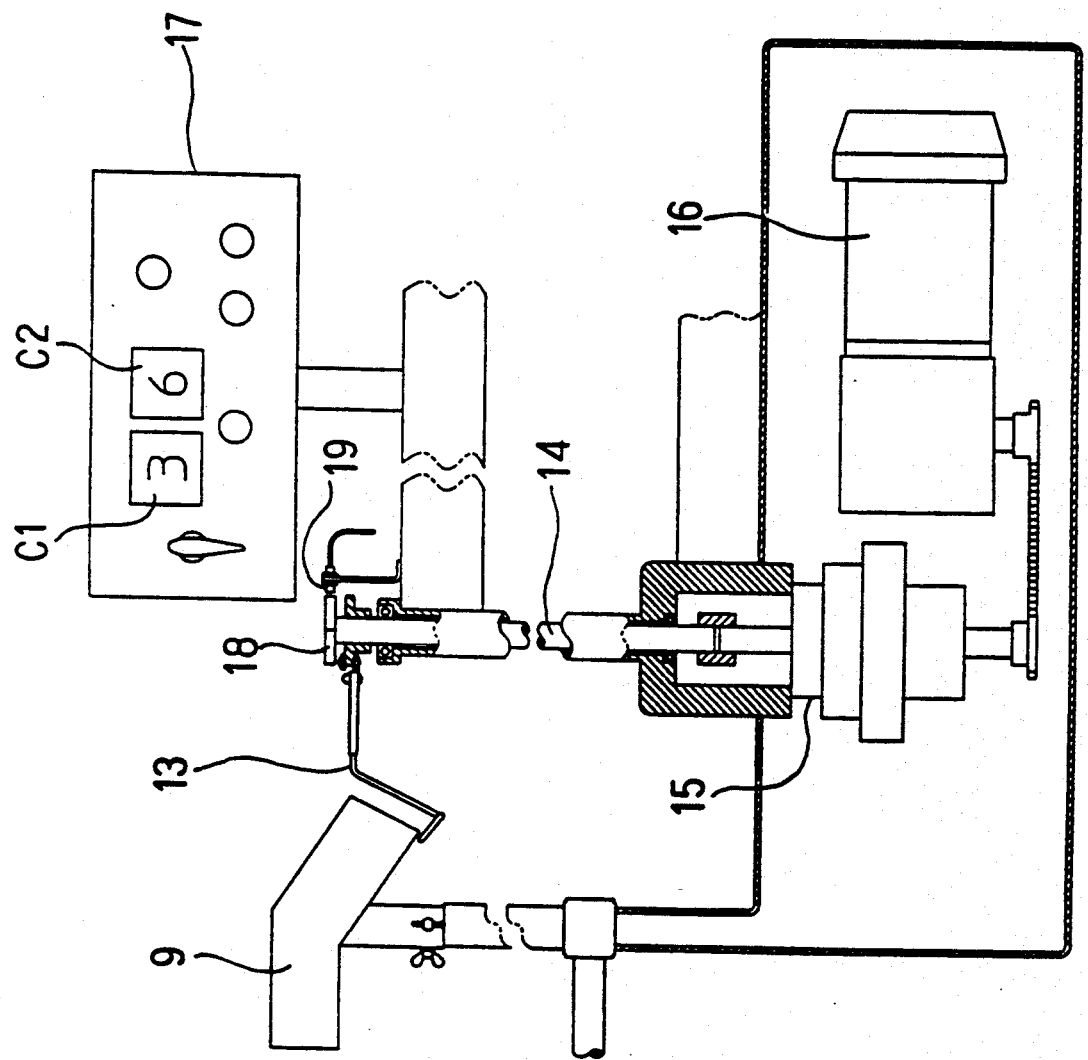
FIG. 4 is a diagram illustrating a controller, a clutch/brake, stop commanding piece, a stop sensor, and components surrounding them in the apparatus shown in FIG. 1.

As also shown in FIG. 4, a stop commanding piece 18 for detecting an angle of rotation of the shaft 14, i.e., an amount of movement of a relevant one of the hooks 13, is mounted on an upper end of the shaft 14. In the illustrated case, since a setting is provided such that each hook rotates by each 90° together with the shaft 14, the stop commanding piece 18 is formed of a substantially square plate, and a stop sensor 19 such as a proximity switch is disposed in proximity to the stop commanding piece 18. This stop sensor 19 generates a signal when an interval between the same and the stop commanding piece 18 has been narrowed, i.e., each time the shaft 14 rotates by 90°. Thus when the stop commanding piece 18 mounted on the shaft 14 is detected by the stop sensor 19 which detects that the hook 13 has reached a desired predetermined position after retaining the chain of products at the retaining position, the clutch is disengaged in response to that detection signal and the brake is actuated, thereby stopping the hook 13 at a predetermined position Next, a description will be given of the operation of the apparatus of this embodiment, centering on the processing of the signal from the proximity switch 8 in the controlling device 17.

Figure 5:
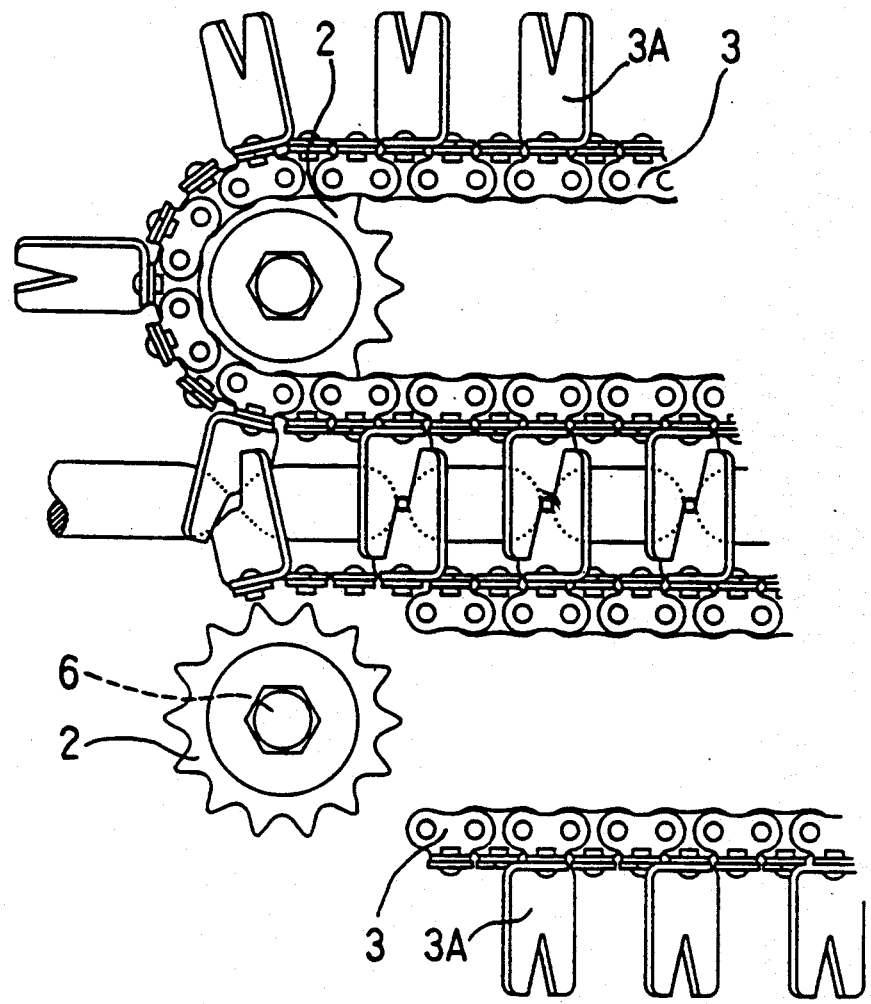
FIG. 5 is a partially enlarged plan view illustrating the relationship among the pitch of a pair of endlessly traveling members for linking, the link length, and the pitch of a rotatively driving member with teeth in the conveying device of the apparatus shown in FIG. 1.

(1) First, the length of one link (e.g., 3 pitches) of the chain of products and the number of links (e.g., 6) to be suspended on one hook are determined, and they are inputted to a first, counter C1 and a second counter C2 of the controlling device 17 (see FIGS. 4 and 5).

(2) Then, prior to the running of the apparatus, adjustment is made of the position of the conveying device 1 with respect to the hook 13 set at a standstill at a desired predetermined position. That is, the phase adjustment of the pinchers 3A of each linking chain 3 is made with respect to the hook 13 in such a manner that a linked portion LA (constricted portion) of a chain of products L is retained by the hook 13 at the retaining position. The running of the apparatus of this embodiment is commenced in such a state. Upon the running of the apparatus, the motor 4 of the conveying device and the motor 16 of the suspending device are started (see FIG. 7).

Figure 6:
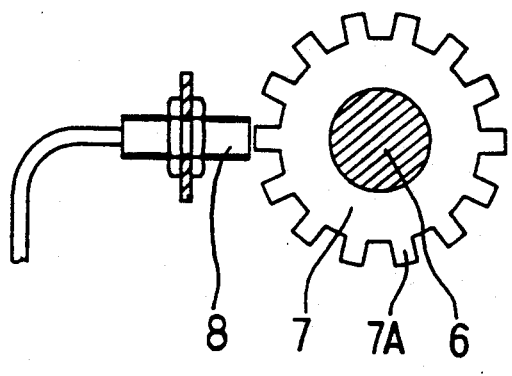
FIG. 6 is an enlarged plan view illustrating a signal generating device, particularly the number of teeth of a toothed member, of the apparatus shown in FIG. 1.

(3) The linking chains 3 of the conveying device 1 convey the chain of products continuously at a fixed speed while forming a chain of linked products, and the chain of linked products is sent out from the guide member 9. In the conveying device 1, a continuous pulse-like detection signal is generated by means of the proximity switch 8 as the toothed member 7 attached to the shaft 6 of the conveying device 1 rotates. The signal is transmitted to the first counter C1. The interval of the pinchers 3A set on each linking chain 3 to a multiple (in this case, 3-fold) of the chain pitch becomes the length of one link (in this case, 3 pitches) of the chain of products (see FIG. 5). The number of teeth of the toothed member 7 is set to be identical with that of the sprocket 2 meshing with the linking chain 3. Therefore, the number of pulses of the detection signal indicates the amount of movement (pitch) of the linking chains 3. In the apparatus of this embodiment, both the toothed member 7 and the sprockets 2 are provided with 14 teeth (see FIGS. 5 and 6).

(4) As for the aforementioned signal, the number of pulses is counted by the first counter C1 (C1 in FIG. 7), and a new pulse is generated for each third pulse corresponding to the three pitches, i.e., the length of one link preset in the first counter C1.

(5) The pulses outputted from the first counter C1 are counted by the second counter C2 as the number of links (C2 in FIG. 7), and a new pulse is generated for each sixth pulse corresponding to the number of links, 6, to be suspended from one hook, which number has been preset in the second counter C2.

(6) Upon receiving the pulse signal generated by the second counter C2, the clutch of the coupling portion 15 is actuated to transmit the torque of the motor 4, so that the hooks 13 move. At the same time, the pump of a stuffing device (not shown) commences operation, and a content which is the material is stuffed into the casing. The hook 13, while moving, retains the linked portion LA of the chain of products and suspends the same. Subsequently, the hook 13 stops moving as the brake of the coupling portion 15 is actuated in response to the signal from the stop sensor 19. In the apparatus of this embodiment, a setting is provided such that the hook 13 stops after rotating by 90° from a fixed position with the shaft 14 as a center. When the hook 13 engages the linked portion LA of the chain of products, the chain of products passing through the guide member 9 changes its direction of travel (form of passage) by being curved toward the trailing side of the hook 13, is discharged from the guide member 9, and is suspended from the hook 13. The passage of travel of the chain of products within the guide member 9 resumes its original position and is set ready for an ensuing retaining operation until an ensuing one of the hooks 13 engages the linked portion LA. Thus, each time the signal is issued from the second counter C2, the hook 13 moves and the chain of products is formed into loops so as to be suspended consecutively from the hooks 13 that follow.

Even in the apparatus of this embodiment which uses the linking chains suitable for high-speed conveyance of the chain of products to squeeze and draw the linked portion LA of the chain of products, the toothed member 7 and the proximity switch 8, which together constitute the signal generating device, accurately convert the amount of movement (angle of rotation) of the shaft 6 rotating at high speed to a signal. Since the hooks 13 are operated intermittently, the speed with which the linked portion of the chain of products, which has been discharged from the guide member set in an immobile manner, is engaged with the hook 13 is high, so that the slippage of the chain of products off the hook can be prevented. The apparatus of this embodiment is suitable for suspending the chain of products having a short link length.

Figure 7:
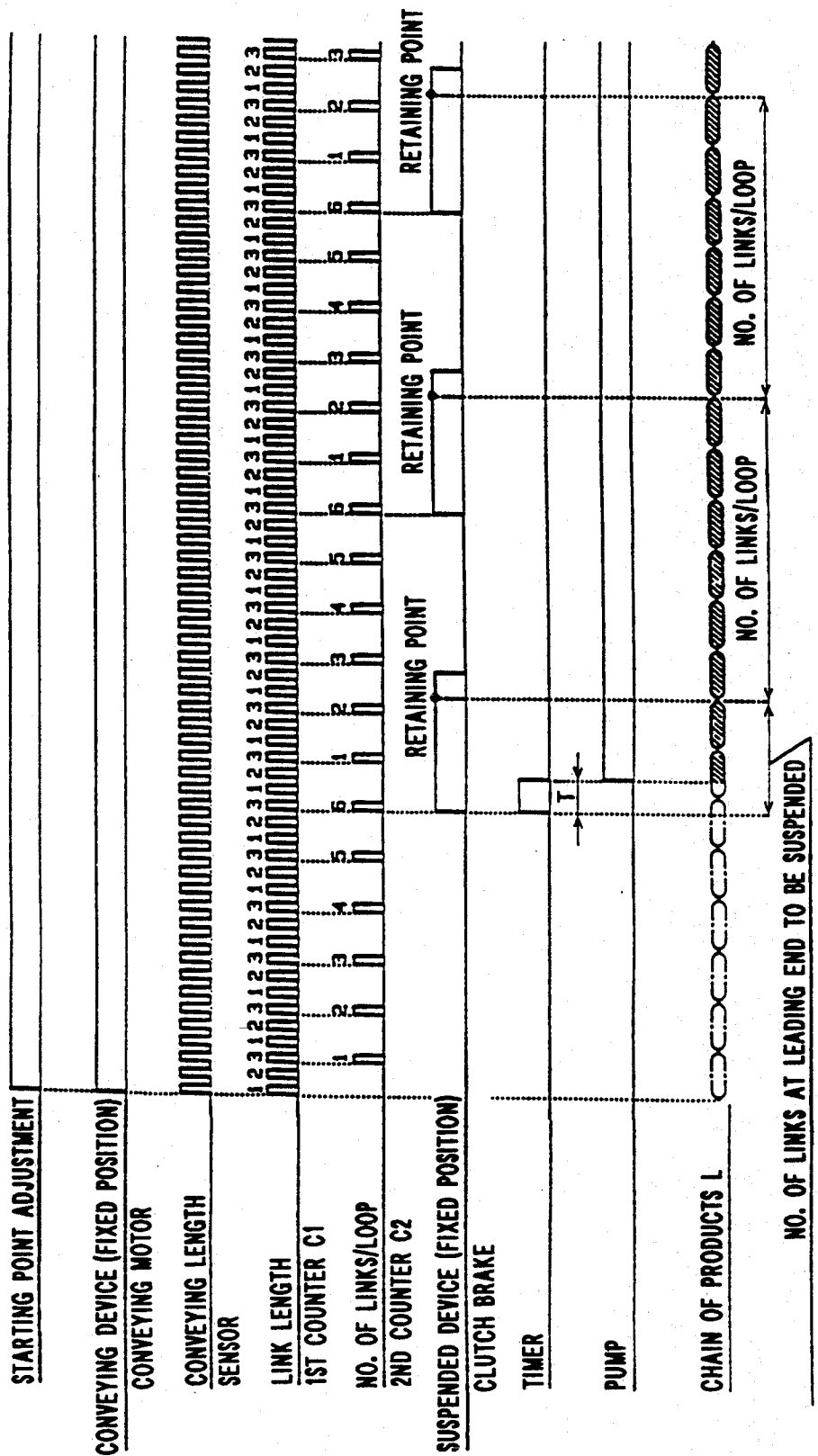
FIG. 7 is a timing chart for the apparatus shown in FIG. 1.

(7) The pump can be operated by being delayed by a time T by means of a timer, as in the case of an example shown in FIG. 7. As a result, the suspension length of a free end portion of an initial loop of the chain of products (i.e., the number of links at a leading end to be suspended) can be set arbitrarily.

(8) Thus, in the apparatus of this embodiment, once the link length and the number of links to be suspended are set, even if the apparatus is stopped temporarily, the apparatus can be restarted immediately without requiring any readjustment unless the link length and the number of links to be suspended are changed.

The present invention is not restricted by the above-described embodiment. For instance, the signal generating device in the conveying device may not be a toothed member having the same number of teeth as that of the rotatively driving member with teeth. That is, it is possible to use a toothed member having a number of teeth which is a multiple of the number of teeth of the rotatively driving member with teeth. In this case, the controlling device may be provided with a converting means, if necessary. In addition, a pulse may be generated by operating a known rotary encoder by means of the driving shaft. Furthermore, a serriform member may be provided on a straight running portion of the chain. The detection can be effected by generating a pulse by an optical or magnetic method.

The signal generating device may be disposed not directly on the conveying device but separately on a device which undergoes a motion equivalent to that of the conveying device, e.g., a servo motor which is proportionally controlled by the shaft 6 of the conveying device.

As the conveying device, it is possible to use either a device which conveys the product which has already been formed into links or an endlessly traveling member for linking which forms links during conveyance. The product which has already been formed into links is preferably conveyed by a pair of opposing belts capable of squeezing or by a drum with a V-groove formed on its outer periphery. The operating noise of the device can be reduced if the chain-sprocket arrangement of the aforementioned linking chain type is substituted by a known timing belt and pulleys having the same pitch and the same number of teeth.

As for the suspending device, the type of the guide member used can be selected, as necessary. The suspending device having the guide member permits high-speed conveyance of the chain of products since the accuracy with which the guide member guides the chain of products to the retaining position is high. As the guide member for receiving the chain of products from the conveying device and for releasing the same into a space, in addition to the fixed type shown in the embodiment, it is possible to use various known ones, such as the one in which a release port rotates with a radius about an axis of rotation, as disclosed in Japanese Patent Publication No. 5899/1966 (U.S. Pat. No. 3,191,222), or one which swings, as disclosed in Japanese Utility Model Laid-Open No. 1594/1975 and Japanese Utility Model Publication No. 12694/1980. It goes without saying that the present invention is also applicable to a suspending apparatus which is not provided with a guide member, such as the suspending apparatus disclosed in Japanese Patent Publication No. 27023/1986 (U.S. Pat. No. 4,218,003).

Furthermore, as for the suspending members in the suspending device, in addition to the type in which the suspending members travel in a horizontal plane as in the above-described embodiment, it is possible to use a type in which they travel in a vertical plane, as will be described later, or in an inclined plane, i.e., an intermediate arrangement. It should be noted that the suspending apparatuses having the guide member of the fixed type and the suspending members traveling in a horizontal plane in Patent Application No. 110050/1989 (U.S. patent Ser. No. 07/515,175) and Japanese Patent Application No. 33668/1990 (U.S. patent Ser. No. 07/512,209) filed by the same applicant as that of the invention of this application.

Figure 8:
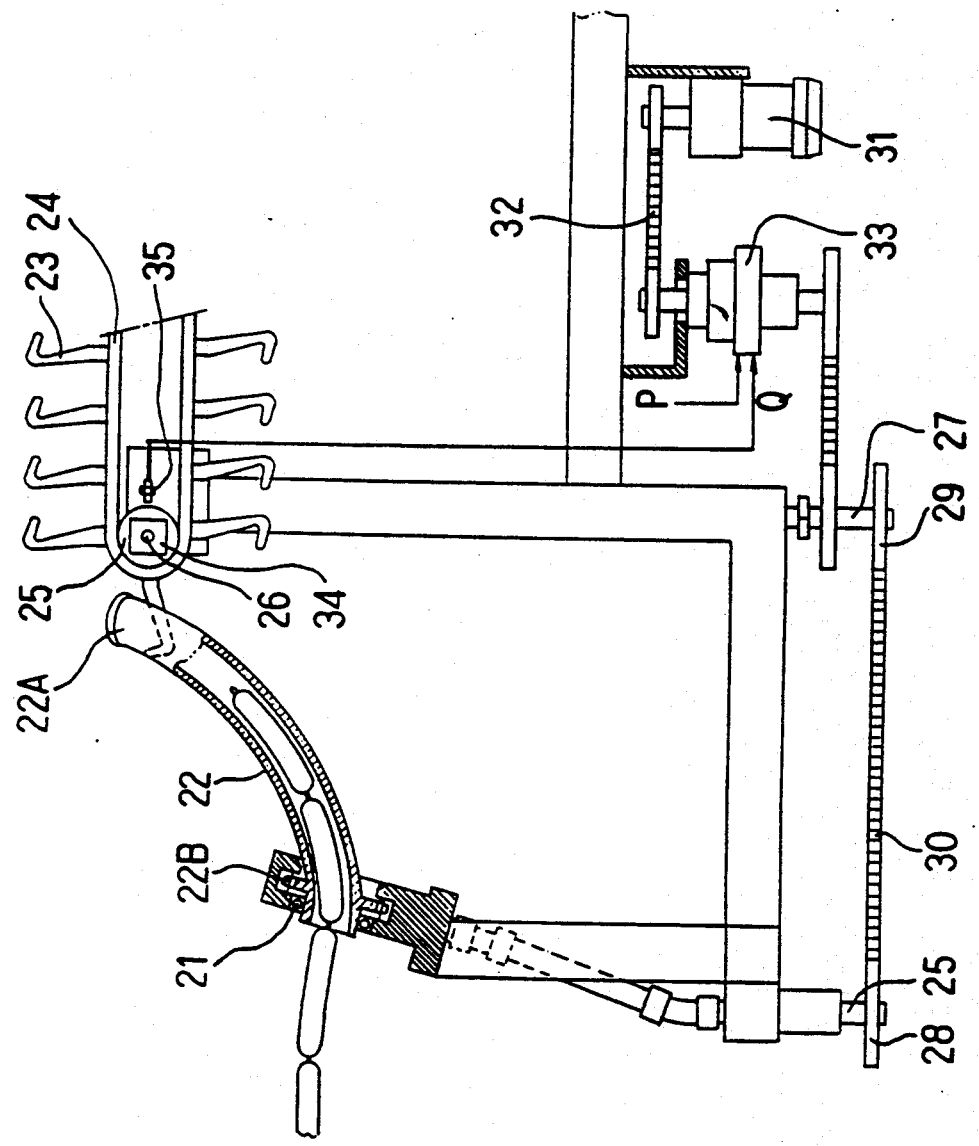
FIG. 8 is a fragmentary front elevational view of the apparatus in accordance, with another embodiment of the present invention.

For instance, in a case where the guide member shown in Japanese Patent Publication No. 5899/1966 (U.S. Pat. No. 3,191,222) is used, a setting is provided such that, as shown in FIG. 8, hooks 23 traveling in a vertical plane pass a portion of the locus of rotation of an outlet portion 22A of a guide member 22 rotating eccentrically as an inlet portion thereof is rotatively supported by a bearing 21. The guide member 22 and the hooks 23 are respectively driven by a shaft 25 for driving a gear 22B of the guide member 22 and by a shaft 27 for driving a shaft 26 on which a sprocket 25 meshing with a chain 24 with the hooks 23 disposed thereon is mounted. The shaft 25 and the shaft 27 are respectively provided with sprockets 28, 29, and a chain 30 is trained therebetween. As a result, when the shaft 25 receives a driving force from the shaft 27, the guide member 22 is operated in synchronism with the hooks 23.

The suspending device is provided with a geared motor 31, which drives a clutch/brake 33 by means of the drive of a belt 32. An output P from the controlling device shown in FIG. 1 and an output Q from a brake sensor are inputted to the clutch/brake 33. The output Q is generated as a signal for stopping the shaft 26 so that the shaft 26 will rotate by each 90° corresponding to the pitch of the hooks 23, when the rotation of a stop commanding piece 34, i.e., a square plate mounted on the shaft 26, is detected by a proximity switch 35.

Figure 9:
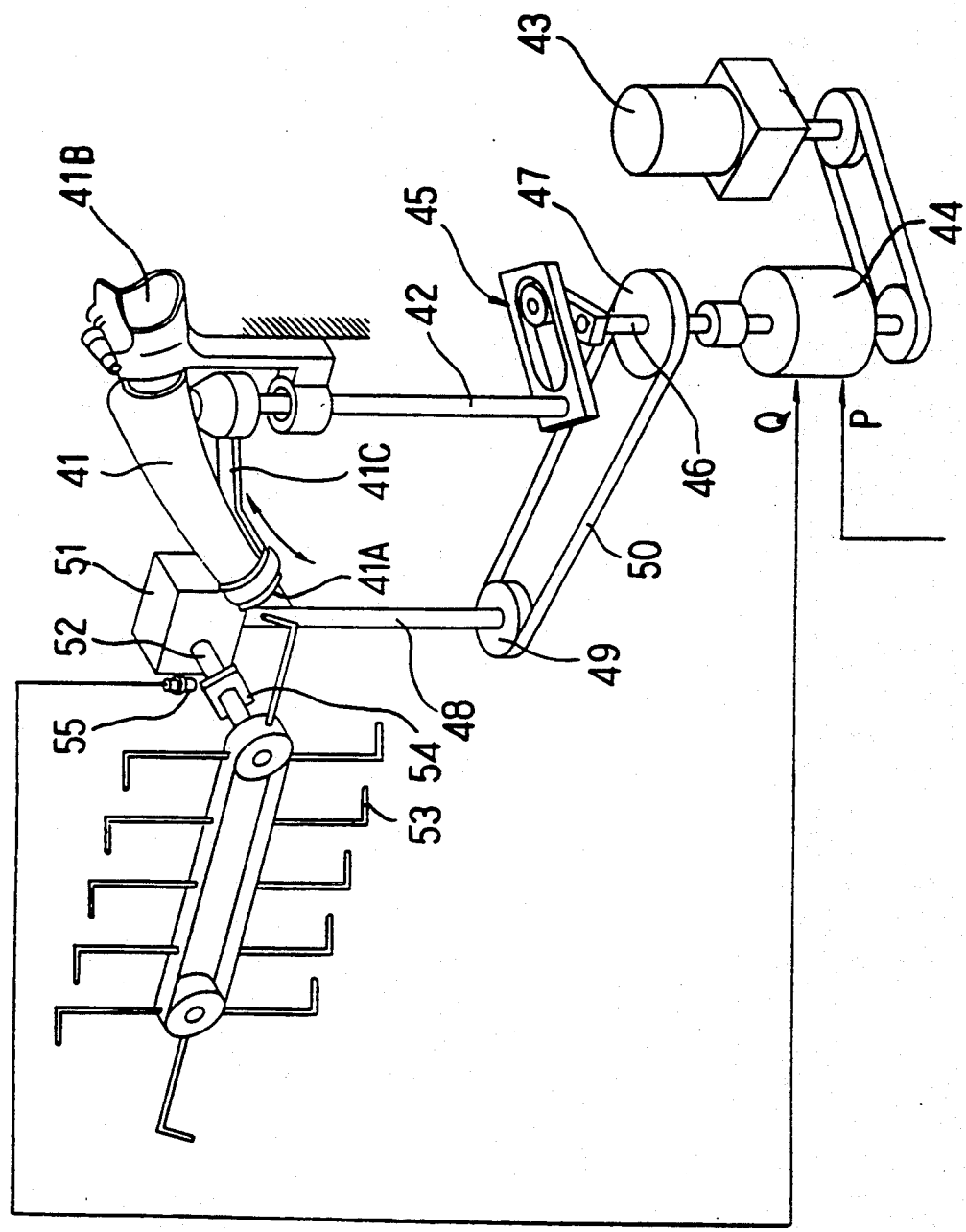
FIG. 9 is a perspective view schematically illustrating still another embodiment of the present invention.

Referring now to FIG. 9, a description will be given of still another embodiment in which the guide member is of a type disclosed in, for instance, Japanese Utility Model Laid-Open No. 1594/1975 or Japanese Utility Model Publication No. 12694/1980. In the drawing, a guide member 41 is of a type in which an outlet portion 41A swings horizontally. The guide member 41 has an inlet portion 41B disposed in an immobile manner and the outlet portion 41A which swings by means of an arm 41C secured to an upper portion of a vertically arranged shaft 42. The shaft 42 is adapted to receive a driving force of geared motor 43 from 46 via a clutch/brake 44 and undergoes swinging motion by means of a crank mechanism 45. The shaft 46 is provided with a sprocket 47, and a chain 50 is trained between the sprocket 47 and a sprocket 49 disposed on a shaft 48. The direction of the rotational force of the shaft 48 is changed by a bevel gear mechanism 51, and the rotational force is then transmitted to a hook-driving shaft 52. The speed ratio of the hook-driving shaft 52 with respect to the shaft 46 is set such that the shaft 52 rotates by 90° while the shaft 46 undergoes one revolution, i.e., while the arm 41C undergoes one swinging motion. Thus synchronization between hooks 53 and the guide member 41 is established. The shaft 52 is provided with a stop commanding piece 54 which is a square plate. In addition, the stop commanding piece 54 is provided with a proximity switch 55 which is located in close proximity thereto. The proximity switch 55 generates the output Q for the brake each time the stop commanding piece 54 is brought into a position close to the proximity switch 55, i.e., by each 90° corresponding to the stop position of the hook, in the same way as in FIG. 8.

The output P from the controlling device and the output Q for the brake are inputted to the clutch/brake 44.

Various forms of the guide members of the apparatus in accordance with the embodiments described above impart unique characteristics to the suspending apparatus, respectively. For instance, the guide member set in an immobile manner allows the chain of products to readily pass therethrough. The guide member whose release port rotates with a fixed radius is capable of forming the chain of products having a large link length more accurately into loops. The guide member whose release port swings with a predetermined radius is capable of forming the chain of products having a small link length more accurately into loops.

Figure 10:
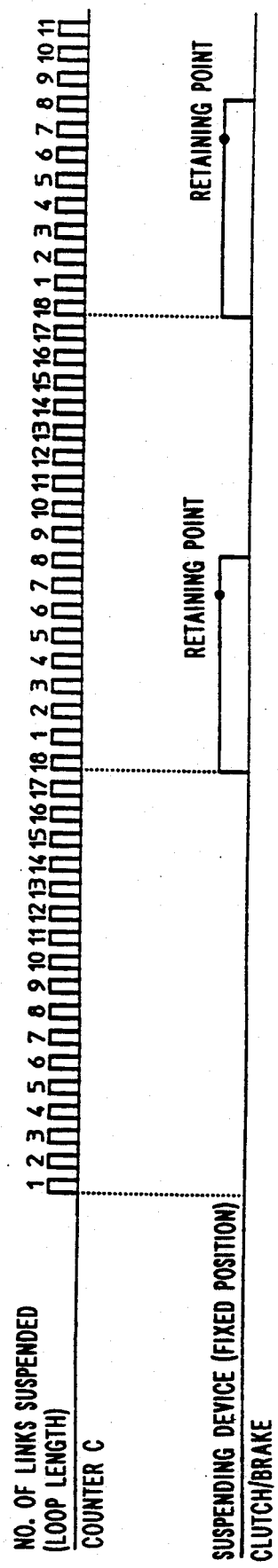
FIG. 10 is a timing chart illustrating the operation of the apparatus in accordance with a further embodiment of the present invention.
Figure 11:
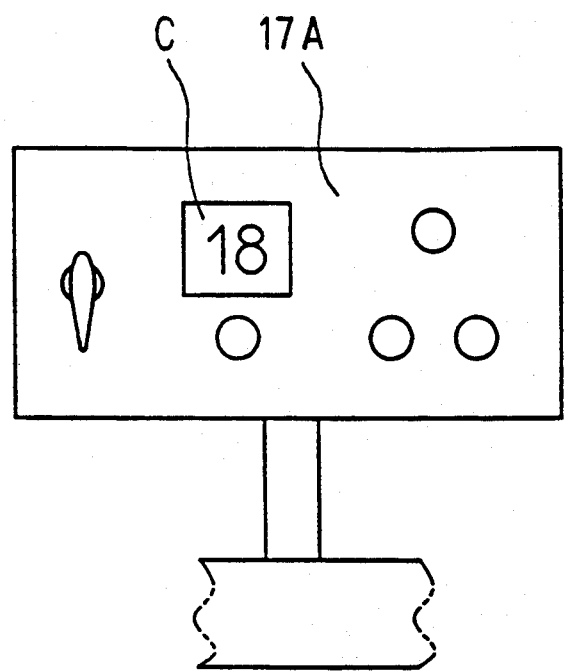
FIG. 11 is a diagram illustrating a controlling device in accordance with the embodiment illustrated in FIG. 10.

Although, in the foregoing embodiments, two counters, i.e., the first counter C1 and the second counter C2, are used, the apparatus of the invention may be implemented by using only one counter C. For instance, in a case where the length of one sausage link corresponds to three chain pitches, and the number of the links to be suspended from one hook is six, one loop should be formed with a length corresponding to 18 pitches. Hence, as shown in FIG. 10, it suffices if a signal for actuating the clutch is generated each time the number of pulses counted by the counter C reaches 18. This is accomplished by providing a controlling device 17A of this embodiment shown in FIG. 11, instead of the controlling device 17 of the apparatus shown in FIG. 4.

Figure 12:
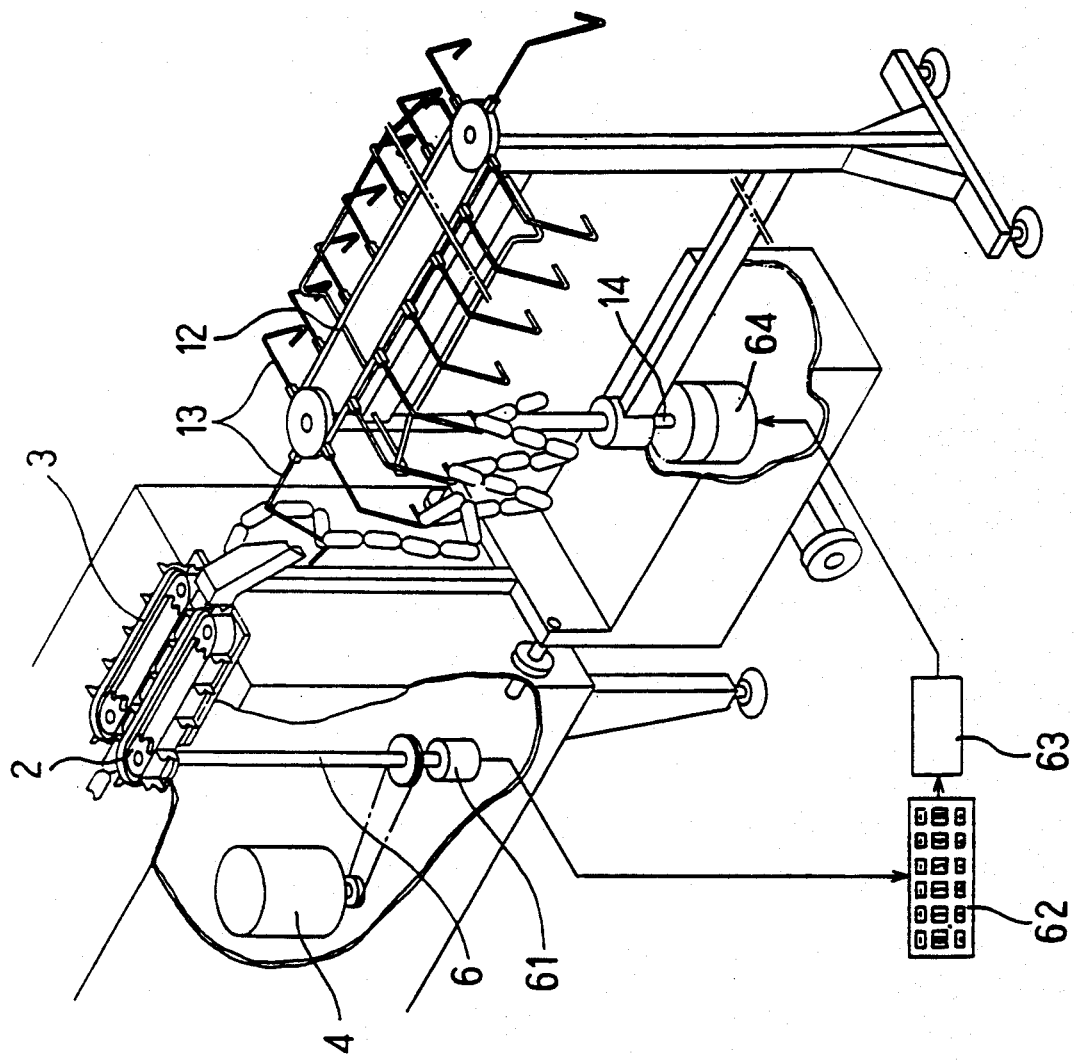
FIG. 12 is a schematic diagram of the apparatus in accordance with a still further embodiment of the present invention.

In addition, the present invention can be implemented by an embodiment as is shown in FIG. 12. In FIG. 12, the shaft 6 for driving the linking chains 3 is provided with a rotary encoder 61 for detecting the amount of movement of the linking chains 3. The rotary encoder 61 generates the number of pulses proportional to the amount of movement of the linking chains 3. A known multiplier 62 for converting the number of pulses, $N_i$, generated by the rotary encoder 61 to a desired number of pulses, $N_o$, is connected between the rotary encoder 61 and a servo driver 63 for driving a servo motor 64 with speed reducer having a reduction ratio of 1/10. That is, the multiplier 62 multiplies the number of pulses, $N_1$, inputted thereto by a multiplying factor K preset in the multiplier 62 to output a number of pulses, $N_o$ (=K $N_i$). The servo motor 64 is connected to the shaft 14 for driving the chain 12 for supporting the hooks 13. The arrangement provided is such that as the shaft 6 undergoes one revolution, the rotary encoder 61 generates, for instance, 300 pulses, and the servo motor 64 undergoes one revolution by, for instance, 500 pulses. Accordingly, in a case where the multiplying factor K of the multiplier 62 is set to 1, the ratio of rotation between the shaft 6 and the shaft 14 becomes 5000 pulses : 300 pulses, i.e., 1 : 1/16.666. In the same way as the apparatus of the above-described embodiment, the pitch of the hooks 13 is 90 degrees in terms of the angle of rotation of the shaft 14, so that the shaft 6 undergoes 4.1666 (16.666) revolutions while the shaft 14 rotates 90 degrees (a ¼ revolution). Meanwhile, an of rotation, $R_i$, of the shaft 6 required for suspending a required number of links from one hook 13 is determined by the amount of movement of the linking chains 3 (14 pitches per revolution since the number of the teeth of the sprocket 2 is 14) at the time when the shaft 6 undergoes one revolution. Accordingly, if the multiplying factor K of the multiplier 62 is set to 4.1666/$R_i$, and the apparatus of this embodiment is run, the number of pulses, $N_i$, generated by the rotary encoder 61 is converted to a desired number of pulses, $N_o$=K $N_i$=(4.1666/$R_i$)×$N_i$ by the multiplier 62, and is outputted to the servo driver 63. Then, the servo motor 64 consecutively moves the hooks 13 to the retaining position each time a desired number of links are discharged from the linking chains 3. To change the length of suspension on the hook 13, it suffices if a newly calculated multiplying factor K, e.g., 0.5, is reset in the multiplier 62. The multiplier used in the apparatus of this invention was the "PRESCALING UNIT, MF-06" manufactured by LINE SEIKI Co., Ltd. In addition, the "RRM SERIES, RRM-500" manufactured by SUMTAK Co., Ltd. was also used. In both cases, it was possible to form desired loops. It should be noted that the servo motor referred to herein includes a stepping motor.

Figure 13:
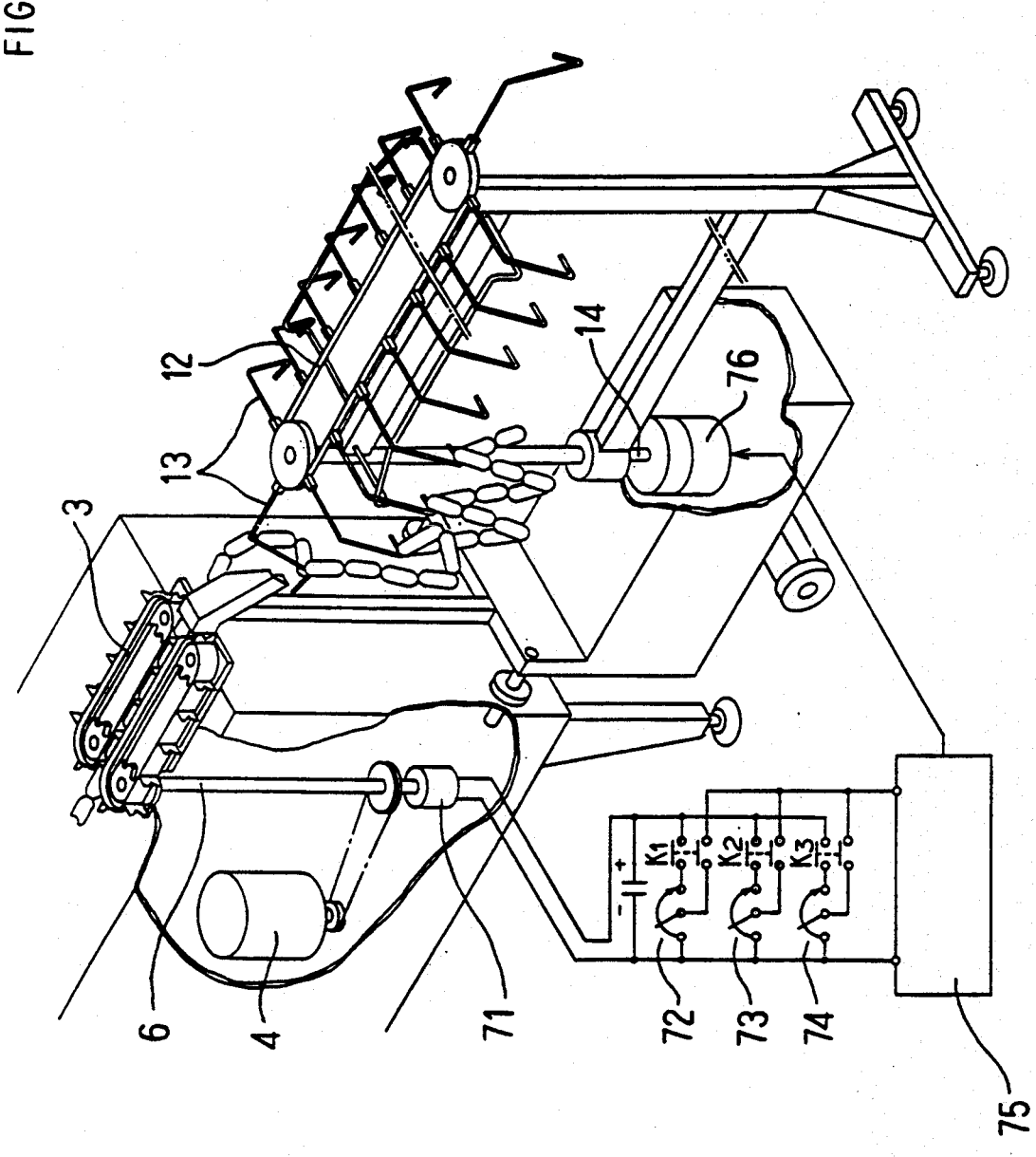
FIG. 13 is a schematic diagram of the apparatus in accordance with a further embodiment of the present invention.

Furthermore, it is possible to effect control by detecting the rotational speed of the shaft 6, as shown in FIG. 13. In the embodiment shown in FIG. 13, the shaft 6 for driving the linking chains is provided with a tachometer generator 71 for generating a voltage proportional to the rotational speed of the shaft 6. The output terminal of the tachometer generator 71 is selectively connected to ratio relays 72, 73, 74 for respectively multiplying that voltage by appropriate multiplying factors $K_1$, $K_2$, $K_3$. As already described in connection with the embodiment shown in FIG. 12, if the number of sausage links to be suspended from one hook is determined, the ratio of the angles of rotation of the shafts 6 and 14 can be determined automatically. That is, the ratio of the rotational speed can be determined automatically. Accordingly, an output voltage is set by selecting from the multiplying factors of the aforementioned ratio relays in such a manner that this ratio of the rotational speed will be maintained. This output voltage is converted to a drive signal by the servo driver 75 so as to drive the servo motor 76.

The hooks in the two embodiments shown in FIGS. 12 and 13 move in a continuous manner, so that the chain of products suspended on the hooks is difficult to swing. Hence, these apparatuses are suitable for suspending long loops.

As it has been stated in the above embodiments that the signal generating device may be the one which generates a pulse signal or one which generates an analog signal, the present invention is not restricted to any particular type of signal, and it suffices if the signal generating device is capable of outputting a value proportional to the amount of movement of the conveying device.

The suspending device, the signal generating device, and the controlling device in accordance with the present invention may employ various forms, and these devices having various forms may be combined freely.

The present invention is applicable not only to the suspending of a chain of products for each predetermined number of links, but also to suspension for each predetermined length in the manufacture of nonlinked tubular continuous products, such as nonlinked salami sausage stuffed in known collagen casings As described above, since the amount of movement of a relevant portion of the conveying device, or a device which undergoes a motion equivalent to that of the conveying device, is detected without directly detecting the links of the chain of products, the present invention offers the following advantages.

(1) As the signal generating device, it is possible to employ a combination of a sensor and an object to be detected (toothed member), with a desired shape and size for facilitating the detection by a sensor, an rotary encoder, a tachometer generator, or the like, and such a signal generating device can be installed in an environment where stains, water, or the like is not attached thereto. Accordingly, the detection accuracy improves remarkably, and detection errors do not occur, so that the size of the loops can be formed accurately. Hence, the apparatus can be applied to high-speed formation of loops.

(2) Once the optimum phases of the conveying device and the suspending members is set, the apparatus is subsequently operated by maintaining the setting without requiring any resetting irrespective of the presence or absence of the chain of products in the suspending apparatus.

(3) Since the suspending apparatus can be operated even when the chain of products is not made to flow therethrough in connection with item (2) above, a running test or adjustment of the apparatus can be facilitated.

(4) Since a setting for changing the suspension length can be made simply within a short time without replacing any component parts, the operation rate of the apparatus can be enhanced.

What is claimed is:

1. A method of suspending a chain of products wherein the chain of products in which a material is stuffed in a casing is conveyed by a conveying device, and the movement of an endlessly traveling member with a plurality of suspending members disposed thereon is controlled such that the chain of products sent from the conveying device is consecutively retained by each of the suspending members for each predetermined number of links, comprising the steps of:
    detecting an amount of displacement of said conveying device and generating a signal of a value proportional to said amount of displacement; and
    controlling said suspending members on the basis of the signal in such a manner that the chain of products is suspended from said each of said suspending members for each predetermined number of links.

2. An apparatus for suspending a chain of products including a conveying device for conveying the chain of products in which a material is stuffed in a casing; a suspending device having a plurality of suspending members disposed on an endlessly traveling member, said suspending device being arranged such that an intersection between a traveling path of said suspending members and a path of the chain of products defines a retaining position; and a controlling device for effecting control such that each of said suspending members is sequentially brought to the retaining position at each timing when the number of links of the chain of products reaches a predetermined number, said apparatus comprising:
    a signal generating device for detecting an amount of displacement of said conveying device and generating a signal of a value proportional to said amount of displacement,
    wherein said controlling device controls the movement of said endlessly traveling member on the basis of the signal from said signal generating device in such a manner that the chain of products is suspended from said each of said suspending members each time the predetermined number of links is reached.

3. An apparatus for suspending a chain of products according to claim 2, wherein said conveying device includes an endlessly traveling member for linking for forming during conveyance the casing with a tubular configuration stuffed with the material therein into links and a rotatively driving member with teeth for meshing with said endlessly traveling member for linking; said signal generating device includes a toothed member with a teeth portion disposed in said conveying device and having the number of teeth which is identical with, or a multiple of, the number of teeth of said rotatively driving member with teeth and a sensor for generating a pulse signal upon detecting an amount or movement of said toothed member; said controlling device includes a first counter for generating a pulse signal for each number corresponding to a link length by counting the number of the pulse signals generated by said signal generating device and a second counter for generating an output signal for each number corresponding to the number of product links to be suspended, by counting the number of the pulse signals generated by said first counter; and said endlessly traveling member of said suspending device is started by the output signal from said second counter and stops after traveling a predetermined distance.

4. An apparatus for suspending a chain of products according to claim 2, wherein said conveying device includes an endlessly traveling member for linking for forming during conveyance the casing with a tubular configuration stuffed with the material therein into links and a rotatively driving member with teeth for meshing with said endlessly traveling member for linking; said signal generating device includes a toothed member with a teeth portion disposed in said conveying device and having the number of teeth which . is identical with, or a multiple of, the number of teeth of said rotatively driving member with teeth and a sensor for generating a pulse signal upon detecting an amount of movement of said toothed member; said controlling device includes a counter for generating an output signal for each number of pulses corresponding to the number of product links to be suspended from one of said suspending members by counting the number of the pulse signals generated by said signal generating device; and said endlessly traveling member of said suspending device is started by the output signal from said counter and stops after traveling a predetermined distance.

5. An apparatus for suspending a chain of products according to claim 2, wherein said conveying device includes an endlessly traveling member for forming during conveyance the casing with a tubular configuration stuffed with the material therein into links and a rotatively driving member with teeth for meshing with said endlessly traveling member for linking; said signal generating device includes a rotary encoder for generating a pulse signal proportional to an amount of movement of said endlessly traveling member for linking; said suspending device includes a servo motor for driving said endlessly traveling member with said suspending members disposed thereon, wherein said rotary encoder and said servo motor are connected to each other via a multiplier for converting the number of output pulses of said rotary encoder to a number of pulses to be imparted to said servo motor by multiplying the number of output pulses of said rotary encoder by a predetermined variable factor.

6. An apparatus for suspending a chain of products according to claim 2, wherein said suspending device has a guide member disposed in an immobile manner and adapted to guide the chain of products sent from said conveying device, toward a retaining position in a substantially horizontally traveling plane of said suspending members, and said guide member has a space for rendering the form of passage of the chain of products through said guide member changeable so that the chain of products is retained by each of said suspending members.

7. An apparatus for suspending a chain of products according to claim 2, wherein said suspending device has a guide member for guiding the chain of products sent from said conveying device, toward a retaining position in a substantially vertically traveling plane of said suspending members, and said guide member has a release outlet which rotates with a predetermined radius about a substantially horizontal axis of rotation where an inlet of said guide member is located.

8. An apparatus for suspending a chain of products according to claim 2, wherein said suspending device has a guide member for guiding the chain of products sent from said conveying device, toward a retaining position in a substantially vertically traveling plane of said suspending members, and said guide member has a release outlet which swings with a predetermined radius about a substantially vertical axis of rotation.

* * * * *

UNITED STATES PATENT AND TRADEMARK OFFICE
CERTIFICATE OF CORRECTION

PATENT NO. : 5,197,915

DATED : March 30, 1993

INVENTOR(S) : Minoru Nakamura, Nobuo Kimura, Minoru Kasai

It is certified that error appears in the above-identified patent and that said Letters Patent is hereby corrected as shown below:

Column 1, line 18, change "are" to --is--.

Column 3, line 18, change "generated" to --generates--.

Column 9, line 67, change "(16.666) to --(=16.666/4)--.

Column 12, line 57 (claim 5, line 3), after "member", insert --for linking--.

Signed and Sealed this

First Day of February, 1994

BRUCE LEHMAN

*Attest:*

*Attesting Officer*    Commissioner of Patents and Trademarks

UNITED STATES PATENT AND TRADEMARK OFFICE
CERTIFICATE OF CORRECTION

PATENT NO. : 5,197,915

DATED : March 30, 1993

INVENTOR(S) : Minoru NAKAMURA et al.

It is certified that error appears in the above-identified patent and that said Letters Patent is hereby corrected as shown below:

On the title page, Item [54]: Title, after "LINKED", insert --PRODUCTS--.
Item [73]: Assignee: change "Hitec" to --HITEC--.

In Fig. 7, change "SUSPENDED DEVICE (FIXED POSITION)" TO --SUSPENDING DEVICE (FIXED POSITION)--.

Col. 1, line 3, after "LINKED", insert --PRODUCTS--;
line 37, after "intersecting", delete "to".

Col. 3, line 45, before "stop", insert --a--;
line 59, delete ",".

Col. 5, line 3, insert --.-- after "travel".

Col. 8, line 12, after "in", insert --the above-described embodiment are disclosed in Japanese--;

line 56, after "from", insert --a shaft--.

Col. 9, line 68, after "an", insert --amount--.

Col. 10, line 68, after "casings", insert --.--.

Col. 11, line 9, delete ",".

UNITED STATES PATENT AND TRADEMARK OFFICE
CERTIFICATE OF CORRECTION

PATENT NO. : 5,197,915
DATED : March 30, 1993
INVENTOR(S) : Minoru Nakamura et al It is certified that error appears in the above-indentified patent and that said Letters Patent is hereby corrected as shown below:

Col. 12, line 20, change "or" to --of--.

Signed and Sealed this

Twenty-ninth Day of March, 1994

Attest:

BRUCE LEHMAN

*Attesting Officer*     *Commissioner of Patents and Trademarks*